(12) United States Patent
Strebel Marzano

(10) Patent No.: US 11,108,185 B2
(45) Date of Patent: Aug. 31, 2021

(54) BUSBAR ADAPTER WITH SHIELDED TERMINALS

(71) Applicant: ROCKWELL AUTOMATION SWITZERLAND GMBH, Aarau (CH)

(72) Inventor: Thomas Strebel Marzano, Birmenstorf (CH)

(73) Assignee: ROCKWELL AUTOMATION SWITZERLAND GMBH

( * ) Notice: Subject to any disclaimer, the term of this patent is extended or adjusted under 35 U.S.C. 154(b) by 0 days.

(21) Appl. No.: 16/555,433

(22) Filed: Aug. 29, 2019

(65) Prior Publication Data
US 2021/0066840 A1 Mar. 4, 2021

(51) Int. Cl.
| | |
|---|---|
| *H01R 13/447* | (2006.01) |
| *H01R 25/16* | (2006.01) |
| *H01R 31/06* | (2006.01) |
| *H01R 13/453* | (2006.01) |
| *H01R 9/26* | (2006.01) |
| *H01R 13/443* | (2006.01) |
| *H01R 13/6581* | (2011.01) |

(Continued)

(52) U.S. Cl.
CPC ......... *H01R 13/447* (2013.01); *H01R 25/162* (2013.01); *H01R 31/06* (2013.01); *H01R 4/4836* (2013.01); *H01R 9/2625* (2013.01); *H01R 13/443* (2013.01); *H01R 13/453* (2013.01); *H01R 13/4534* (2013.01); *H01R 13/4538* (2013.01); *H01R 13/506* (2013.01); *H01R 13/5213* (2013.01); *H01R 13/6581* (2013.01); *H01R 25/142* (2013.01); *H01R 43/26* (2013.01); *H02B 1/056* (2013.01)

(58) Field of Classification Search
CPC .................. H01R 13/4534; H01R 13/453; H01R 13/443; H01R 13/447; H01R 13/5213; H01R 13/44; H01R 13/4538; H01R 13/6581; H01R 4/4836; H01R 31/06; H01R 25/162; H01R 25/16; H01R 25/142; H01R 43/26; H01R 9/2625; H01R 13/506; H02B 1/056
USPC ....... 439/135, 136, 137, 140, 141, 148, 149, 439/304
See application file for complete search history.

(56) References Cited

U.S. PATENT DOCUMENTS

| | | | |
|---|---|---|---|
| 5,030,119 A | 7/1991 | Lowe | |
| 5,588,853 A * | 12/1996 | Anthony | ............ H01R 13/5213 220/375 |

(Continued)

FOREIGN PATENT DOCUMENTS

| | | | | |
|---|---|---|---|---|
| DE | 102015115197 A1 * | 3/2017 | ........... H01R 25/142 |
| DE | 102015115197 A1 | 3/2017 | |

(Continued)

OTHER PUBLICATIONS

Extended European Search Report issued from the European Patent Office, application No. 20191837.2, dated Dec. 21, 2020 (pp. 1-12).

(Continued)

*Primary Examiner* — Abdullah A Riyami
*Assistant Examiner* — Justin M Kratt

(57) ABSTRACT

An electrical adapter includes a post portion, an electrical terminal, and a cover. The electrical terminal extends from the post portion. The cover is slideably engaged with the post portion to selectively shield the electrical terminal.

15 Claims, 5 Drawing Sheets

(51) Int. Cl.
　　　*H01R 4/48*　　　(2006.01)
　　　*H01R 25/14*　　(2006.01)
　　　*H01R 43/26*　　(2006.01)
　　　*H01R 13/506*　(2006.01)
　　　*H02B 1/056*　　(2006.01)
　　　*H01R 13/52*　　(2006.01)

(56) References Cited

U.S. PATENT DOCUMENTS

| | | |
|---|---|---|
| 6,666,698 B2 | 12/2003 | Beck, Jr. et al. |
| 7,307,227 B2 | 12/2007 | Buettner |
| 7,410,385 B2 | 8/2008 | Buttner |
| 7,427,209 B2 | 9/2008 | Bouchan et al. |
| 7,686,629 B1 * | 3/2010 | Yu .................. H01R 13/447 439/136 |
| 8,038,455 B1 | 10/2011 | Moraes et al. |
| 8,331,081 B2 | 12/2012 | Abrahamsen et al. |
| 8,333,600 B2 | 12/2012 | Yanniello |
| 9,312,668 B2 | 4/2016 | Faber et al. |
| 9,722,346 B1 * | 8/2017 | McWethy ............ H01R 13/516 |
| 9,748,024 B2 | 8/2017 | Romero Legorreta et al. |
| 9,762,038 B2 | 9/2017 | Schroeder |
| 2002/0025703 A1 * | 2/2002 | Chen .................. H01R 13/4538 439/141 |
| 2016/0322790 A1 | 11/2016 | Becerra Becerra et al. |

FOREIGN PATENT DOCUMENTS

| | | |
|---|---|---|
| EP | 0774801 A2 | 5/1997 |
| EP | 1936755 A1 | 6/2008 |
| EP | 2713450 A1 | 4/2014 |
| EP | 2237379 B1 | 10/2014 |
| EP | 2897236 B1 | 12/2017 |
| EP | 3142196 B1 | 12/2018 |
| WO | 2019091985 A1 | 5/2019 |

OTHER PUBLICATIONS

Hirschmann Test & Measurement, Stecker / plugs, SLS 200, Product Information, Apr. 2013, 1 page.

* cited by examiner

BUSBAR ADAPTER WITH SHIELDED TERMINALS

CROSS-REFERENCES TO RELATED APPLICATIONS

Not Applicable.

STATEMENT REGARDING FEDERALLY SPONSORED RESEARCH

Not Applicable.

BACKGROUND

This disclosure relates generally to electrical power distribution components and, more particularly, to electrical terminals corresponding to power distribution components.

BRIEF SUMMARY

Some embodiments of the present disclosure provide an electrical adapter that includes a post portion, an electrical terminal, and a cover. The electrical terminal can extend from the post portion. The cover can be slideably engaged with the post portion to selectively cover the electrical terminal.

Some embodiments of the present disclosure provide a busbar adapter that includes a post portion, an electrical terminal, a cover, and a spring. The electrical terminal can extend from the post portion. Additionally, the cover can be slideably engaged with the post portion to selectively cover the electrical terminal. The spring can urge the cover away from the post portion.

Some embodiments of the present disclosure provide a busbar adapter that includes a post portion, an electrical terminal, a cover, and a lever assembly. The electrical terminal can extend from the post portion. The cover can be slideably engaged with the post portion to selectively cover the electrical terminal. Additionally, the lever assembly can be engaged with the cover to extend the cover from the post portion.

To the accomplishment of the foregoing and related ends, embodiments of the technology can include one or more of the features hereinafter fully described. The foregoing and following description and the annexed drawings set forth in detail certain example aspects of the technology. However, these aspects are indicative of but a few of the various ways in which the principles of the technology can be employed. Other aspects, advantages and novel features of the technology will become apparent from the detailed description herein as considered along with the drawings.

DETAILED DESCRIPTION

Figure 1:
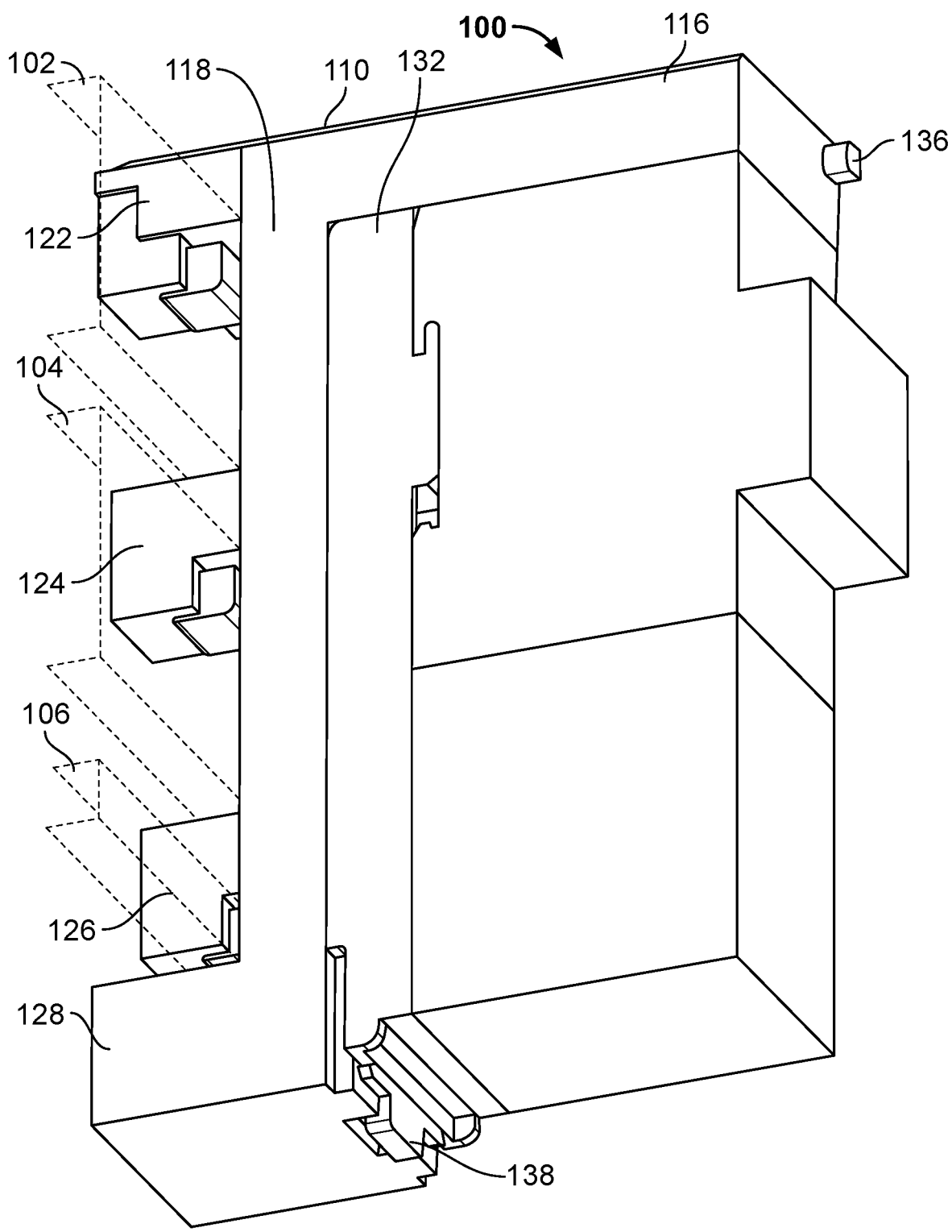
FIG. 1 is an isometric view of a first example power delivery assembly according to an aspect of the present disclosure.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

As described above, the present disclosure relates generally to electrical power distribution components and, more particularly, to electrical terminals corresponding to power distribution components. Three-phase electrical power is used for a variety of industrial applications, and accordingly, three-phase power distribution systems are widely implemented. For example, such three-phase electrical power distribution systems can include three elongated bar-shaped conductors that carry alternating electric currents that are offset to one another by a phase shift. Certain busbar adapters can clip onto the three elongated bar-shaped conductors. The busbar adapters can secure and electrically connect interchangeable power delivery modules to the three elongated bar-shaped conductors. The power delivery modules can, for example, provide and modulate three-phase electrical energy to various types of electric motors. However, busbar adapters do not provide a way to cover electrical terminals when a power delivery module is removed.

Therefore, a need exists for busbar adapter bases that protect electrical terminals when a power delivery module, or other module type, is removed.

As explained herein, the present disclosure provides busbar adapters that shield electrical terminals. As non-limiting examples, the busbar adapters may have terminals shaped as forks, pins, spades, etc. to engage interchangeable power delivery modules (e.g., starters, motor protection devices, soft starters, variable frequency drives, etc.). Additionally, as non-limiting examples, the busbar adapters may have a cover, a shield, a housing, etc. to protect the terminals.

As will be appreciated, the present disclosure provides busbar adapters that can be configured to shield unoccupied electrical terminals (which can be "live," in certain situations). Accordingly, the busbar adapters may prevent damage to the electrical terminals, and therefore may conserve repair part materials. Additionally, the busbar adapters may aid in keeping the electrical terminals clean.

With reference to FIG. 1, a first example power delivery system 100 is shown connected to a first conductor 102, a second conductor 104, and a third conductor 106 (shown in phantom). The first example power delivery system 100 can include a first example busbar adapter 110 and a power delivery module 112.

Figure 2:
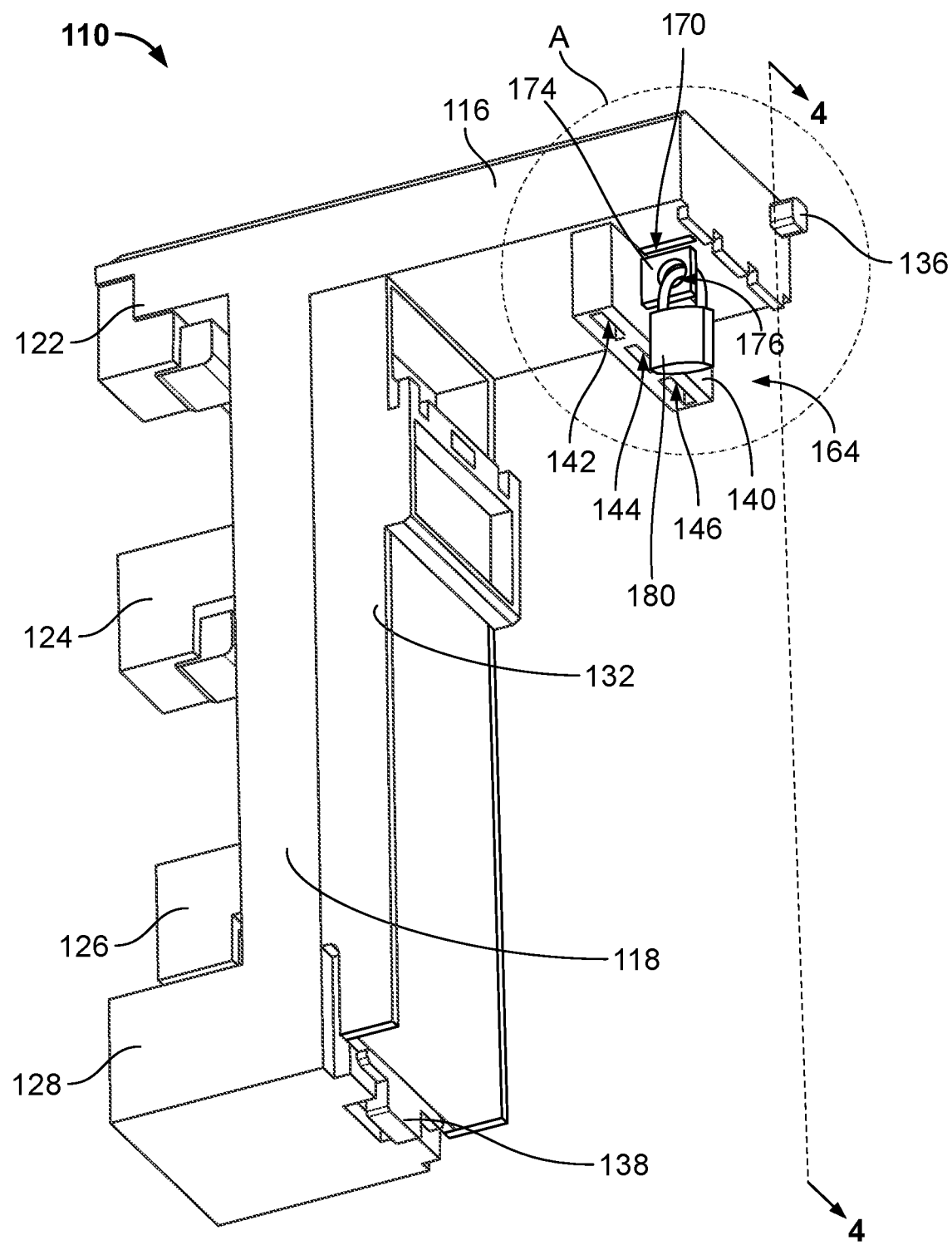
FIG. 2 is an isometric view of a first example busbar adapter of the first example power delivery assembly of FIG. 1 with a terminal shield in an extended position according to an aspect of the present disclosure.
Figure 3A:
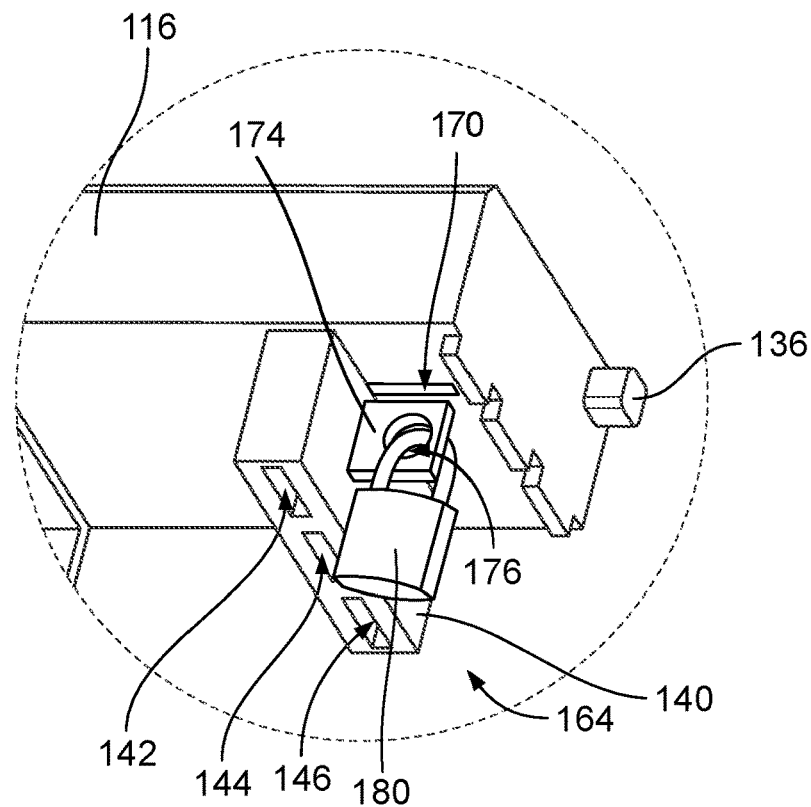
FIG. 3A is an enlarged isometric view of the first example busbar adapter of FIG. 2 taken from section A of FIG. 2 according to an aspect of the present disclosure.
Figure 3B:
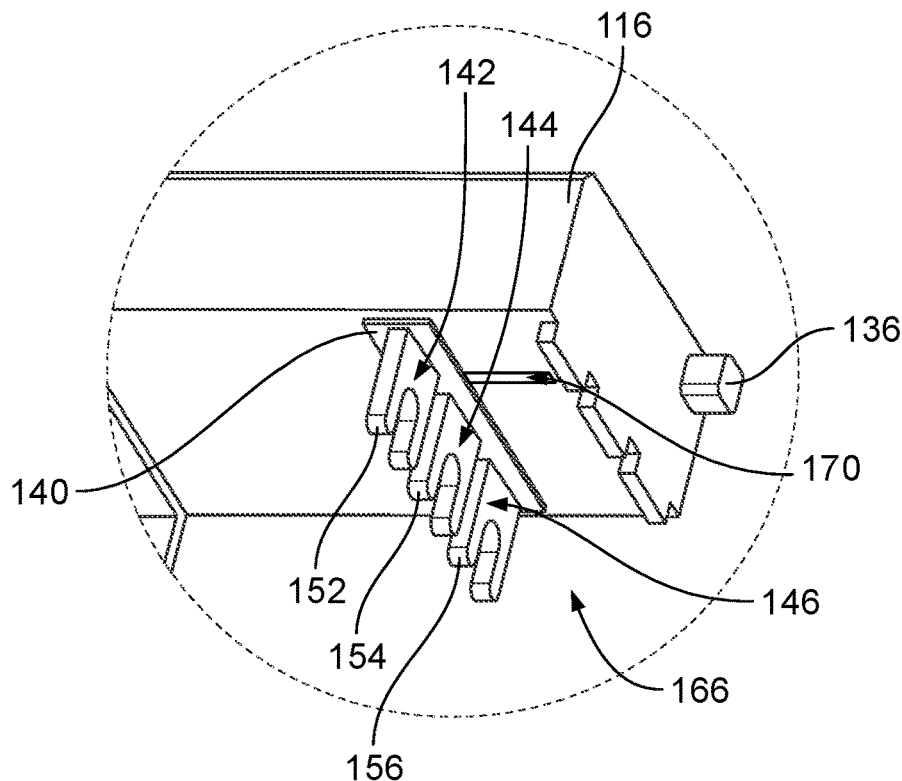
FIG. 3B is an enlarged isometric view of the first example busbar adapter of FIG. 2 taken from section A of FIG. 2 with the terminal shield in a retracted position according to an aspect of the present disclosure.
Figure 4:
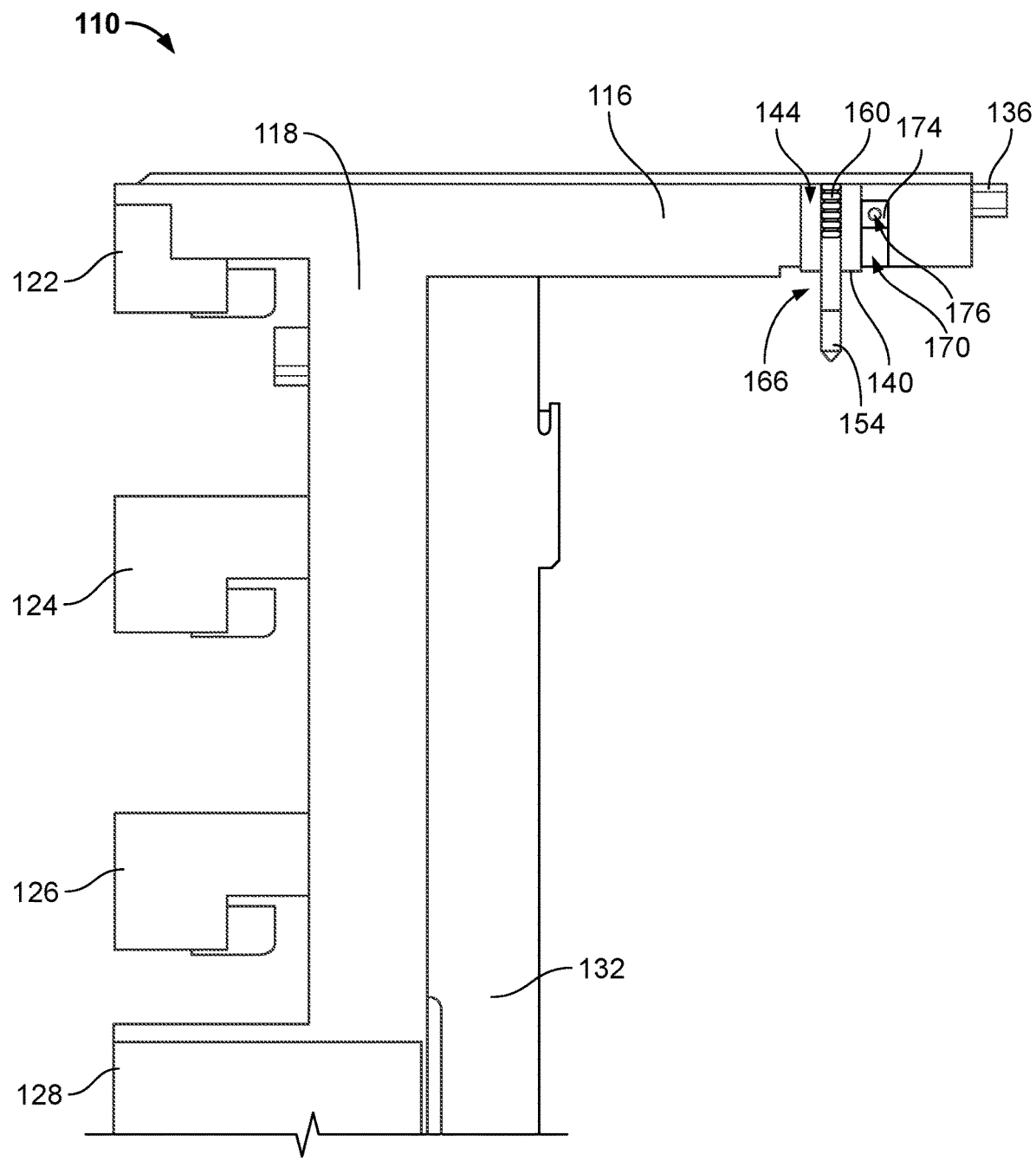
FIG. 4 is a cross-sectional view of the first example busbar adapter of FIG. 2 taken along line 4-4 of FIG. 2 according to an aspect of the present disclosure.

With reference to FIGS. 1-4, the first example busbar adapter 110 can include a post portion 116, a bed portion 118, a first leg 122, a second leg 124, a third leg 126, a fourth leg 128, a sled 132, a release button 136, and/or a release tab 138. With particular reference to FIGS. 2-4, the first example busbar adapter 110 can further include a cover 140. In some embodiments (see, e.g., FIGS. 2-3B), the cover 140 can define a first opening 142, a second opening 144, and/or a third opening 146. As shown by FIG. 3B, the first example busbar adapter 110 can further include a first terminal 152, a second terminal 154, and/or a third terminal 156. With reference to FIG. 4, the first example busbar adapter 110 can further include a spring 160.

Referring to FIGS. 1, 2, and 4, the post portion 116 can extend generally perpendicularly from the bed portion 118 (e.g., to form a "L" shape). The first leg 122, the second leg 124, the third leg 126, and the fourth leg 128 can also extend from the bed portion 118. In some embodiments, the first leg 122, the second leg 124, the third leg 126, and the fourth leg 128 extend from the bed portion 118 opposite from the post portion 116.

Referring to FIGS. 1 and 2, the release button 136 can extend into and slideably engage with the post portion 116. Further, the release tab 138 can be pivotably engaged with the bed portion 118.

In some embodiments, the sled 132 is configured to removably slideably engage the bed portion 118. As an example, when the sled 132 abuts the post portion 116, the release tab 138 can snap against the sled 132, thus retaining the sled 132 on the bed portion 118. In some embodiments, the release tab 138 may be pivoted relative to the bed portion 118, such that the sled 132 releases from the bed portion 118.

Referring specifically to FIG. 1, the first leg 122 can hook onto the first conductor 102, the second leg 124 can hook onto the second conductor 104, and the third leg 126 can hook onto the third conductor 106. The first conductor 102 can be between the first leg 122 and the second leg 124. Further, the second conductor 104 can be between the second leg 124 and the third leg 126. The third conductor 106 can be between the third leg 126 and the fourth leg 128.

Still referring to FIG. 1, the power delivery module 112 is shown connected to the sled 132. Thus, the power delivery module 112 can slide along the bed portion 118 with the sled 132. Further, when the release tab 138 snaps against the sled 132 to retain the sled 132 on the bed portion 118, the power delivery module 112 can secure to the busbar adapter 110. It should be understood that electrical energy from the first conductor 102, the second conductor 104, and the third conductor 106 can be transmitted through the busbar adapter 110 to the power delivery module 112. When the release tab 138 is pivoted relative to the bed portion 118 to release the sled 132, the power delivery module 112 can also be released from the bed portion 118.

Referring to FIGS. 2-4, the cover 140 can be slideably engaged with the post portion 116. The cover 140 can slide relative to the post portion 116 between an extended position 164 shown in FIGS. 2 and 3A and a retracted position 166 shown in FIGS. 3B and 4, for example. The cover 140 can be a generally rectilinear sleeve (see, e.g., FIGS. 2-4). It should be understood that the cover 140 may have any shape (e.g., a tube, a tray, a cage, cylindrical, ovate, polygonal, ovular, etc.) to guard the first terminal 152, the second terminal 154, and the third terminal 156.

Referring specifically to FIG. 4, the spring 160 is shown to be disposed in the post portion 116. As shown, the spring 160 is between and engaged with the post portion 116 and the cover 140. The spring 160 can urge the cover 140 out of the post portion 116 toward the extended position 164. In some embodiments, moving the cover 140 from the extended position 164 to the retracted position 166 compresses the spring 160.

Referring to FIG. 3B, the cover 140 can be slideably engaged with the first terminal 152, the second terminal 154, and the third terminal 156. The first terminal 152 is shown to be slideably disposed in the first opening 142. The second terminal 154 is shown to be slideably disposed in the second opening 144. The third terminal 156 is shown to be slideably disposed in the third opening 146. The first terminal 152, the second terminal 154, and the third terminal 156 can be engaged with the post portion 116.

Referring to FIGS. 2 and 3A, when the cover 140 is in the extended position 164, the cover 140 can extend from the post portion 116 generally parallel to and co-directionally with the bed portion 118. When the cover 140 is in the extended position 164, the cover 140 can cover the first terminal 152, the second terminal 154, and the third terminal 156. Thus, the first terminal 152, the second terminal 154, and the third terminal 156 can be obscured by the cover 140 in FIGS. 2 and 3A.

Referring specifically to FIG. 4, when the cover 140 is in the retracted position 164, the cover 140 can be pushed into the post portion 116. Looking specifically at FIG. 3B, when the cover 140 is in the retracted position 166, the first terminal 152, the second terminal 154, and the third terminal 156 are shown to be exposed. Thus, the first terminal 152, the second terminal 154, and the third terminal 156 are shown in FIG. 3B.

Referring to FIGS. 2-4, in other words, the cover 140 can move from the retracted position 166 to the extended position 164 to selectively cover (e.g., shield, guard, protect, etc.) the first terminal 152, the second terminal 154, and the third terminal 156, according to some embodiments.

Referring to FIGS. 1-4, in operation, when the assembled sled 132 and power delivery module 112 are introduced and then slid along the bed portion 118, the power delivery module 112 can contact the cover 140 in the extended position 164 and push the cover 140 into the post portion 116 to the retracted position 166. As the cover 140 is pushed into the post portion 116, the first terminal 152, the second terminal 154, and the third terminal 156 can be exposed and inserted into respective openings in the power delivery module 112 (not shown). When the power delivery module 112 and the sled 132 abut the post portion 116, the release tab 138 can snap retainingly against the sled 132, and the first terminal 152, the second terminal 154, and the third terminal 156 can be engaged with the power delivery module 112. Thus, the power delivery module 112 can be electrically connected to the first conductor 102, the second conductor 104, and the third conductor 106 via the busbar adapter 110. In other words, movement of the sled 132 toward the post portion 116 can retract the cover 140 to expose the first terminal 152, the second terminal 154, and the third terminal 156.

Referring to FIGS. 1-4, further in operation, when the release tab 138 is pressed (e.g., by an operator), the assembled sled 132 and power delivery module 112 can be slideably released from the bed portion 118. As the power delivery module 112 moves away from the post portion 116, the first terminal 152, the second terminal 154, and the third terminal 156 can be pulled from the power delivery module 112 and the spring 160 can urge the cover 140 out of the post portion 116 from the retracted position 166 to the extended position 164. As the cover 140 extends from the post portion 116, the first terminal 152, the second terminal 154, and the third terminal 156 can be covered by the cover 140. Thus, the first terminal 152, the second terminal 154, and the third terminal 156 may be shielded when the power delivery module 112 is removed from the busbar adapter 110. In other words, movement of the sled 132 away the post portion 116 can extend the cover 140 to shield the first terminal 152, the second terminal 154, and the third terminal 156.

Referring to FIG. 1, additionally in operation, the release button 136 may be pushed into the post portion 116 to release the first leg 122, the second leg 124, and the third leg 126 respectively from the first conductor 102, the second conductor 104, and the third conductor 106.

Referring to FIGS. 2, 3A, and 4, in some embodiments, the post portion 116 defines a slot 170 and a tab 174 extends from the cover 140. The tab 174 defines an opening 176. The slot 170 is configured to receive the tab 174. In other words, the tab 174 is slideably engaged with the post portion 116 via the slot 170. With reference to FIG. 3A, a lock 180 may be engaged with the tab 174 via the opening 176. When the lock 180 is engaged with the tab 174, the tab 174 is blocked from sliding into the slot 170. Thus, when the lock 180 is engaged with the tab 174, the lock 180 holds the cover 140 in the extended position 164. With reference to FIG. 4, when the cover 140 is in the retracted position 166, the tab 174 is disposed in the post portion 116 in the slot 170.

Figure 5:
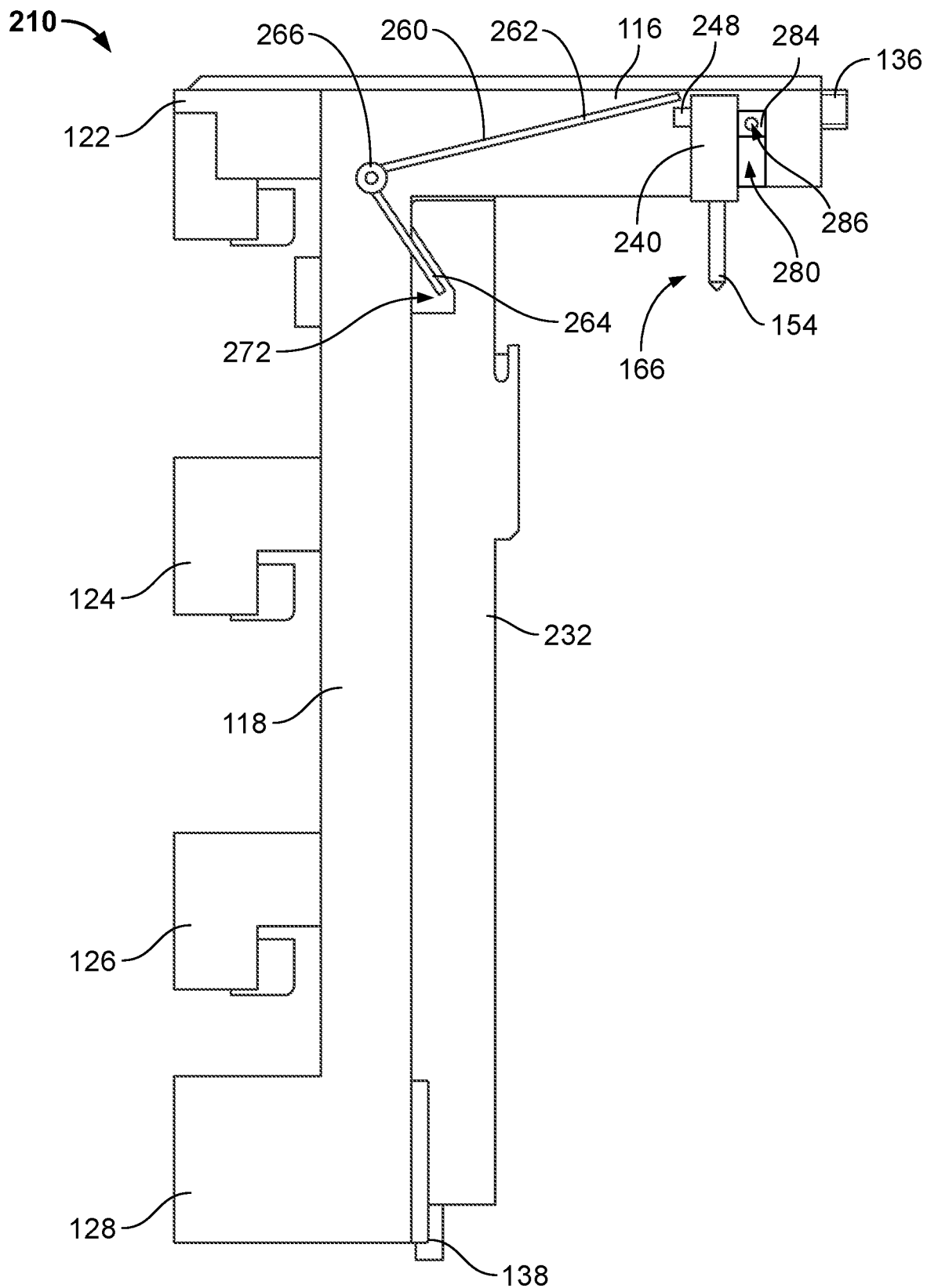
FIG. 5 is a cross-sectional view of a second example busbar adapter according to an aspect of the present disclosure.

Referring to FIG. 5, a second example busbar connector 210 is shown to include a sled 232, a cover 240, a tab 248, and a lever assembly 260. The cover 240 can define a first, second, and a third opening in the same manner as the cover 140 of the first example busbar adapter 110 (not shown). The lever assembly 260 can include a first arm 262, a second arm 264, and a connector 266. In some embodiments, the sled 232 defines a notch 272.

Referring again to FIG. 5, the second example busbar adapter 210 can further include the post portion 116, the bed portion 118, the first leg 122, the second leg 124, the third leg 126, the fourth leg 128, the release button 136, the release tab 138, and the second terminal 154. The second example busbar adapter 210 can further include the first terminal 152 and the third terminal 156 (not shown).

Referring again to FIG. 5, the cover 240 can engage the post portion 116 the first terminal 152, the second terminal 154, and the third terminal 156 in the same manner as the cover 140 of the first example busbar adapter 110. The sled 232 can engage the post portion 116, the bed portion 118, and the release tab 138 in the same manner, for example, as the sled 132 of the first example busbar adapter 110.

Referring again to FIG. 5, the lever assembly 260 can be pivotably engaged with the bed portion 118 via the connector 266. As shown, the first arm 262 is engaged with the tab 248. The second arm 264 can be partially disposed in the notch 272 to engage the sled 232.

Referring again to FIG. 5, in other words, the cover 240 can extend and retract to selectively cover (e.g., shield, guard, protect, etc.) the first terminal 152, the second terminal 154, and the third terminal 156.

Referring again to FIG. 5, in operation, when the assembled sled 232 and power delivery module 112 (not shown) are introduced and then slid along the bed portion 118, the sled 232 can slide over the second arm 264, and the power delivery module 112 can contact the cover 240. As the power delivery module 112 pushes the cover 240 into the post portion 116, the tab 248 can actively engage the first arm 262 to pivot the second arm 264 into the notch 272. Additionally, as the power delivery module 112 pushes the cover 240 into the post portion 116, the first terminal 152, the second terminal 154, and the third terminal 156 can be exposed and inserted into respective openings in the power delivery module 112 (not shown). When the power delivery module 112 and the sled 232 abut the post portion 116, the release tab 138 can snap retainingly against the sled 232, and the first terminal 152, the second terminal 154, and the third terminal 156 can be engaged with the power delivery module 112. Thus, the power delivery module 112 can be electrically connected to the first conductor 102, the second conductor 104, and the third conductor 106 via the busbar adapter 210. In other words, movement of the sled 132 toward the post portion 116 can retract the cover 140 to expose the first terminal 152, the second terminal 154, and the third terminal 156.

Referring to FIG. 5, further in operation, when the release tab 138 is pressed (e.g., by an operator), the assembled sled 232 and power delivery module 112 can be slideably released from the bed portion 118. As the power delivery module 112 moves away from the post portion 116, the first terminal 152, the second terminal 154, and the third terminal 156 can be pulled from the power delivery module 112. Additionally, as the sled 232 moves away from the post portion 116, the sled 232 can actively engage the second arm 264 to pivot the first arm 262 against the tab 248 to push the cover 240 out of the post portion 116. As the cover 240 extends from the post portion 116, the first terminal 152, the second terminal 154, and the third terminal 156 can be covered by the cover 240. Thus, the first terminal 152, the second terminal 154, and the third terminal 156 may be shielded when the power delivery module 112 is removed from the busbar adapter 210. In other words, the sled 232, the lever assembly 260, and the tab 248 can work to desmodromically extend the cover 240 from the post portion 116. In yet other words, movement of the sled 132 away from the post portion 116 extends the cover 140 to shield the first terminal 152, the second terminal 154, and the third terminal 156.

Referring to FIG. 5, additionally in operation, the release button 136 may be pushed into the post portion 116 to release the busbar adapter 210 from the first conductor 102, the second conductor 104, and the third conductor 106 shown in FIG. 1.

Referring to FIG. 5, in some embodiments, the post portion 216 defines a slot 280 and a tab 284 extends from the cover 240. The tab 284 defines an opening 286. The slot 280 is configured to receive the tab 284. In other words, the tab 284 is slideably engaged with the post portion 216 via the slot 280. A lock (not shown) may be engaged with the tab 284 via the opening 286. When the lock is engaged with the tab 284, the tab 284 is blocked from sliding into the slot 280. Thus, when the lock is engaged with the tab 284, the cover 240 is held in the extended position (not shown). With reference to FIG. 5, when the cover 240 is in the retracted position 166, the tab 284 is disposed in the post portion 216 in the slot 280.

Referring to FIGS. 1-5, it is contemplated that the components of the first and second example busbars adapters 110, 210 are sized, configured, and constructed to meet or exceed rating IP2X of the International Electrotechnical Commission (IEC) standard 60529.

From the foregoing, it will be appreciated that the above first and second example busbar adapters 110, 210 can be electrical adapters configured to shield unoccupied electrical terminals (which can be "live," in certain situations). Thus, the first and second example busbar adapters 110, 210 may prevent damage to the electrical terminals. Accordingly, the above disclosed first and second example busbar adapters 110, 210 may conserve repair part materials. Additionally, the first and second example busbar adapters 110, 210 may aid in keeping the electrical terminals clean. Thus the above disclosed first and second example busbar adapters 110, 210 may conserve electrical energy by providing robust electrical connections.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Within this specification embodiments have been described in a way which enables a clear and concise specification to be written, but it is intended and will be appreciated that embodiments may be variously combined or separated without parting from the present disclosure. For example, it will be appreciated that all preferred features described herein are applicable to all aspects of the present disclosure.

Thus, while the present disclosure has been described in connection with particular embodiments and examples, the present disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the present disclosure are set forth in the following claims.

What is claimed is:

1. A busbar adapter, comprising:
a post portion;
an electrical terminal extending from the post portion;
a cover slideably engaged with the post portion to cover the electrical terminal at an extended position and expose the electrical terminal at a retracted position;
a spring to urge the cover away from the post portion; and
a tab extending from the cover, slideably engaged with the post portion, and configured to engage a lock to hold the cover in the extended position.

2. The busbar adapter of claim 1, wherein:
the spring is disposed in the post portion,
the spring is disposed between and engaged with the post portion and the cover, and
the spring urges the cover from the retracted position toward the extended position.

3. The busbar adapter of claim 1, further comprises a bed portion, the post portion and bed portion forming an L shape.

4. The busbar adapter of claim 1, wherein the cover is a rectilinear sleeve.

5. The busbar adapter of claim 1, wherein the electrical terminal is slideably engaged with the cover.

6. The busbar adapter of claim 1, wherein the cover defines an opening and the electrical terminal is at least partially disposed in the opening.

7. An electrical adapter, comprising:
a post portion;
an electrical terminal extending from the post portion; and
a cover slideably engaged with the post portion to cover the electrical terminal at an extended position and expose the electrical terminal at a retracted position;
a bed portion engaged with the post portion, the post portion extending generally perpendicularly from the bed portion; and
a sled removeably connected to the bed portion, wherein movement of the sled away from the post portion extends the cover to cover the electrical terminal.

8. The electrical adapter of claim 7, further comprises a tab extending from the cover, slideably engaged with the post portion, and configured to engage a lock to hold the cover in the extended position.

9. The electrical adapter of claim 7, wherein the cover defines an opening and the electrical terminal is at least partially disposed in the opening.

10. The electrical adapter of claim 7, wherein the electrical terminal is slideably engaged with the cover.

11. The electrical adapter of claim 7, wherein the cover is a rectilinear sleeve.

12. The electrical adapter of claim 7, wherein:
the cover defines a first opening, a second opening, and a third opening,
the electrical terminal is a first electrical terminal, and
the first electrical terminal is at least partially disposed in the first opening, and further comprising:
a second electrical terminal at least partially disposed in the second opening; and
a third electrical terminal at least partially disposed in the third opening.

13. The electrical adapter of claim 7, further comprises a lever assembly engaged with the cover to extend the cover from the post portion.

14. The electrical adapter of claim 13, wherein the lever assembly is partially disposed in the post portion.

15. The electrical adapter of claim 13, wherein the sled defines a notch to engage the lever assembly to:
extend the cover when the sled moves away from the post portion to cover the electrical terminal, and
retract the cover when the sled moves toward the post portion to expose the electrical terminal.

* * * * *